United States Patent [19]
Williams et al.

[11] Patent Number: 5,255,142
[45] Date of Patent: Oct. 19, 1993

[54] THIN FILM MAGNETIC HEAD WITH NARROW YOKE

[75] Inventors: Edgar M. Williams, Palo Alto; Peter G. Bischoff, Cupertino, both of Calif.; Shin-ichi Akoh, Hirakata, Japan

[73] Assignee: Read-Rite Corp., Milpitas, Calif.

[21] Appl. No.: 47,309

[22] Filed: Apr. 19, 1993

Related U.S. Application Data

[63] Continuation of Ser. No. 789,934, Nov. 12, 1991.

[51] Int. Cl.$^5$ .................. G11B 5/127; G11B 5/147
[52] U.S. Cl. ........................... 360/126; 360/125
[58] Field of Search ............ 360/126, 125, 123, 119, 360/122

[56] References Cited

U.S. PATENT DOCUMENTS

| | | | |
|---|---|---|---|
| 4,782,416 | 11/1988 | Hillenbrand et al. | 360/126 X |
| 4,987,510 | 1/1991 | Schewe et al. | 360/126 |
| 5,109,311 | 4/1992 | Hanazono et al. | 360/126 X |

Primary Examiner—John H. Wolff
Attorney, Agent, or Firm—Nathan N. Kallman

[57] ABSTRACT

A thin film magnetic head is fabricated with a yoke structure, including P1 and P2 magnetic layers, having a width in the range of about 5 to 58 microns, preferably about 30 microns. The very narrow width minimizes popcorn noise, improves high frequency response and affords increased head circuit efficiency.

7 Claims, 1 Drawing Sheet

THIN FILM MAGNETIC HEAD WITH NARROW YOKE

This application is a continuation of application Ser. No. 07/789,934, filed Nov. 12, 1991.

FIELD OF THE INVENTION

This invention relates to thin film magnetic heads and in particular to the structure of the magnetic yoke of a thin film head.

BACKGROUND OF THE INVENTION

Thin film magnetic heads are used extensively in data processors, such as disk drives. A typical thin film head comprises, inter alia, a nonmagnetic ceramic substrate, first and second magnetic layers that form a yoke, and an electrically conducting coil. The magnetic flux that is generated in the yoke interacts with current in the conducting coil to effectuate transducing of data signals during write and read modes. Conventionally, the first magnetic yoke layer P1 is formed as a substantially planar layer above the substrate and the second magnetic yoke layer P2 is configured in spaced relation above the P1 layer with the electrical coil interposed between the two magnetic layers. A via or through hole is provided to allow contact between the P1 layer and the P2 layer to form a back closure. An insulating layer provides the transducing gap between two pole tips at the end of the yoke structure which interfaces with a magnetic medium during reading and recording of data signals.

One problem that is experienced when operating with thin film heads is head relaxation noise, also known as popcorn noise, which is associated with the magnetic domains inherent in the yoke material. This noise manifests itself as noise spikes which adversely affect the data signal being processed. The level of noise is in proportion to the length of the domain wall that is collinearly aligned with the electrical coil turns. It is highly desirable to reduce the degrading noise and thus improve the signal-to-noise ratio.

Another factor to be considered, particularly for high frequency applications, is the efficiency of the head circuit which is related to the magnitude of circuit inductance. A lowered inductance results in an improvement in circuit efficiency.

Constant efforts have been made to reduce the noise problem and improve head operating efficiency. In an abstract delivered at the Intermag Conference in Pittsburgh in April, 1991, entitled "A Study of Popcorn Noise for Thin Film Heads", K. Morikawa et al. describe an approach for decreasing popcorn noise by narrowing the width of the yoke and/or changing the Fe composition of the magnetic Fe-Ni material used in the yoke. The abstract describes a change in the width of the yoke from 170 $\mu$m to 80 $\mu$m in order to reduce popcorn noise by 70%. Another article that discusses noise relaxation in thin film heads is found in an abstract by K. B. Klassen et al., IEEE Trans. Magn. MAG-25, 3212-3214 (1989). These prior art thin film heads still experience a significant level of popcorn noise and are characterized by a relatively high inductance which adversely affects the signal being processed through the heads.

SUMMARY OF THE INVENTION

An object of this invention is to provide a thin film magnetic head that operates with a significant reduction in popcorn noise.

Another object of this invention is to provide a thin film magnetic head having lowered inductance with improved high frequency response.

Another object of this invention is to provide a thin film magnetic head wherein degradation of head performance which results from unfavorable magnetic domain configuration is minimized.

According to this invention, a thin film magnetic head is formed with a very narrow magnetic yoke having a width in the range of about 5 to 58 micrometers or microns ($\mu$m). The yoke width is critical to ensure that misalignment of the domains of the magnetic material of the yoke is minimized.

In a preferred embodiment of the invention, the yoke structure of a thin film head was made with a narrow rectangular section having substantially parallel sides extending from the back closure and delineating the width of the yoke structure, a frustoconical section extending from the rectangular section, and a short pole piece section including the transducing gap. The frustoconical section and short section approximate a funnel type configuration. In the preferred implementation, the narrow rectangular section measured between the parallel sides has a width of approximately 30 $\mu$m. The thin film head has an overall height of about 130 $\mu$m and 42 coil turns encompass the yoke structure. With this implementation, it was found that popcorn noise was virtually eliminated and high frequency response and circuit efficiency were greatly improved, as measured during several tests of the novel yoke design having the specified critical dimensions.

BRIEF DESCRIPTION OF THE DRAWING

The invention will be described in greater detail with reference to the drawing in which.

DETAILED DESCRIPTION OF THE PREFERRED EMBODIMENT

Figure 1:
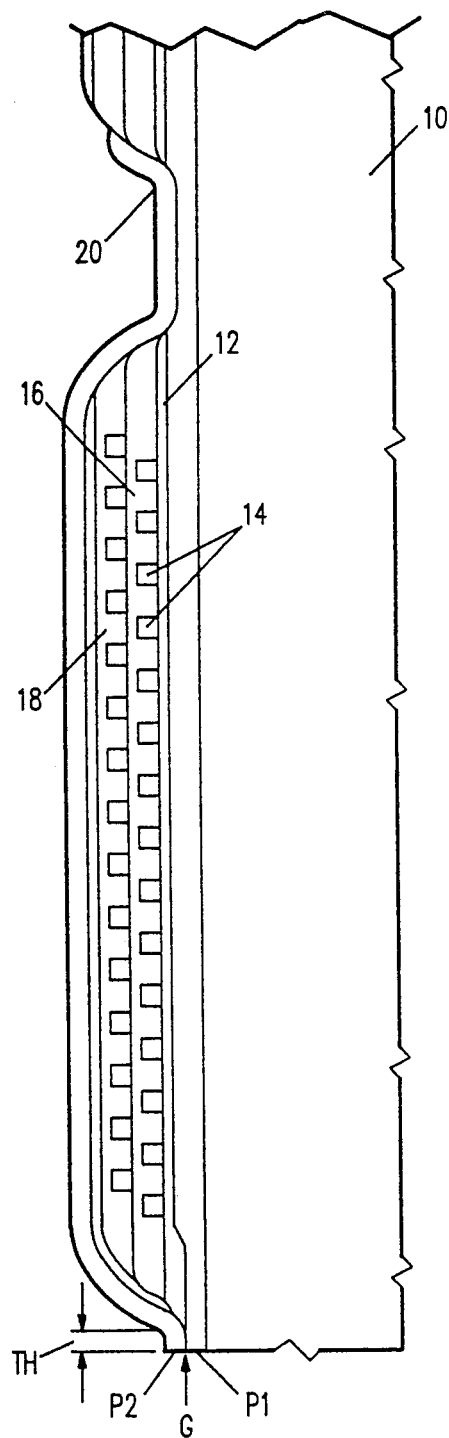
FIG. 1 is a schematic cross-sectional view of a typical thin film magnetic head.

With reference to FIG. 1, a typical thin film head is formed with a magnetic yoke comprising a first Permalloy layer P1 and a second Permalloy layer P2. The P1 layer is deposited over a very thin Permalloy seed layer which was formed over an alumina undercoat that was laid down on a polished surface of a ceramic substrate 10. A first insulating layer 12 of aluminum oxide, which provides the transducing gap G, is then deposited. A patterned electrical coil structure 14, illustrated with two layers by way of example, is then formed and defined by photolithography masking techniques and chemical etching. Insulation layers 16 and 18 are deposited to cover the coil structure 14 and insulate the coil structure from the P1 and P2 magnetic layers. Vias are provided to allow electrical connection of the coil assembly to the head circuit. The P2 layer is deposited and formed to make contact with the P1 layer at the back closure 20 so that a continuous magnetic flux path is provided. The P1 and P2 layers delineate the yoke structure of the magnetic head. The throat height TH is illustrated in FIG. 1. A protective insulating overcoat (not shown), is then deposited over the head structure, by radio frequency (r.f.) r.f. sputtering for example, to provide structural strength and protection during the machining and lapping of the air bearing slider or substrate on which the thin film head is formed. Bonding pads, interconnects and wiring are provided to conduct data signals from and to the head during the read and write modes.

Figure 3:
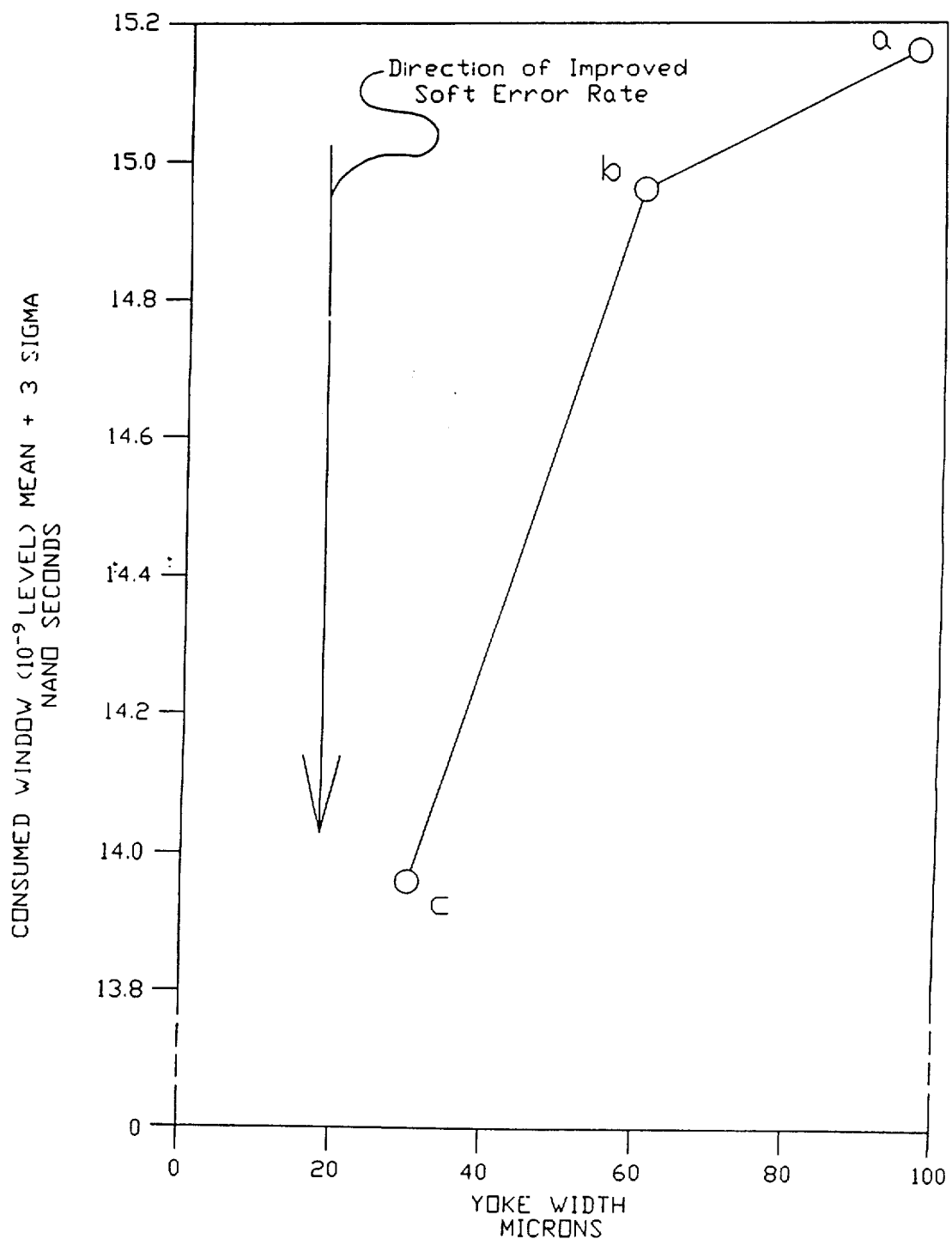

In keeping with this invention, the yoke structure comprising the P1 and P2 layers is formed with a width in the range of about 5 to 58 $\mu$m. The widths of the pole tips P1W and P2W are shown in relation to the width of the yoke structure. We have found reduced popcorn noise at a width of about 30 $\mu$m with no losses in desired electrical performance. In a well controlled experiment wherein all yoke structures were produced by the same processing procedure from the same wafer having a nickel-iron alloy composition with a magnetostriction less than $1 \times 10^{-6}$ and approaching zero magnetostriction, designs of yoke widths of 30 $\mu$m, 60 $\mu$m and 90 $\mu$m were made. Several heads of these different yoke widths were made from the wafer and were examined and tested to determine the effects of all noise terms (resistive, inductive, popcorn related noise) on the consumed window +3 sigma in nanoseconds. The larger the consumed window +3 sigma, the greater is the noise contribution from all noise sources. Therefore a low value of consumed window +3 sigma is desired for designs of improved or superior performance of the read/write head with respect to data integrity. The air bearing magnetic heads with the different width yokes had a flying height of about 4.5 $\mu$ inch and a standard 1400 Oersted magnetic disk was used. Experimental data from the single wafer were obtained for 94, 155 and 77 heads of 90, 60 and 30 $\mu$m yoke widths respectively. Both the ½ amplitude pulse widths and output signal levels fell into acceptable narrow ranges of $82 \pm 1$ nanoseconds and 327 $\mu$volts $\pm 15$. In FIG. 3, points a, b, c indicate the mean for the yoke widths of 90 $\mu$m, 60 $\mu$m and 30 $\mu$m repectively. The critical yoke width was determined to be below 60 $\mu$m, at which point b shown in FIG. 3 the rate of change or slope of the curve accelerates.

Figure 2:
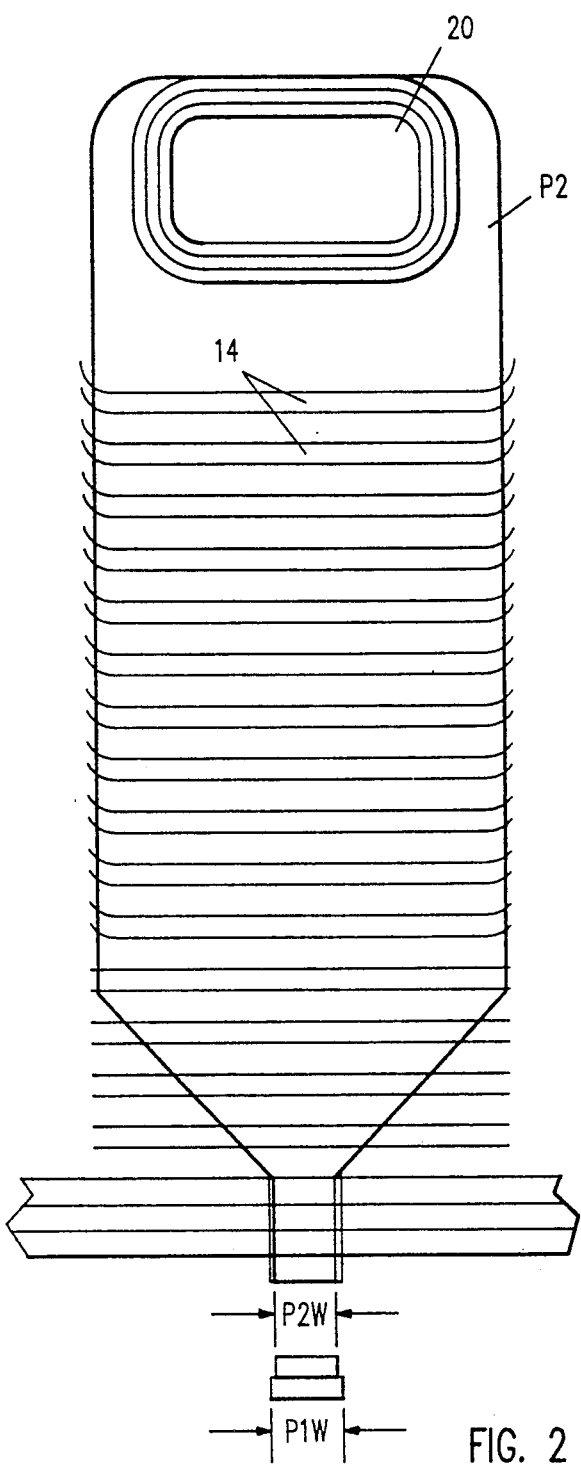
FIG. 2 is a top plan view, partly broken away, illustrating the novel design with the very narrow yoke portion of a thin film magnetic head, made in accordance with this invention.
Figure 4:
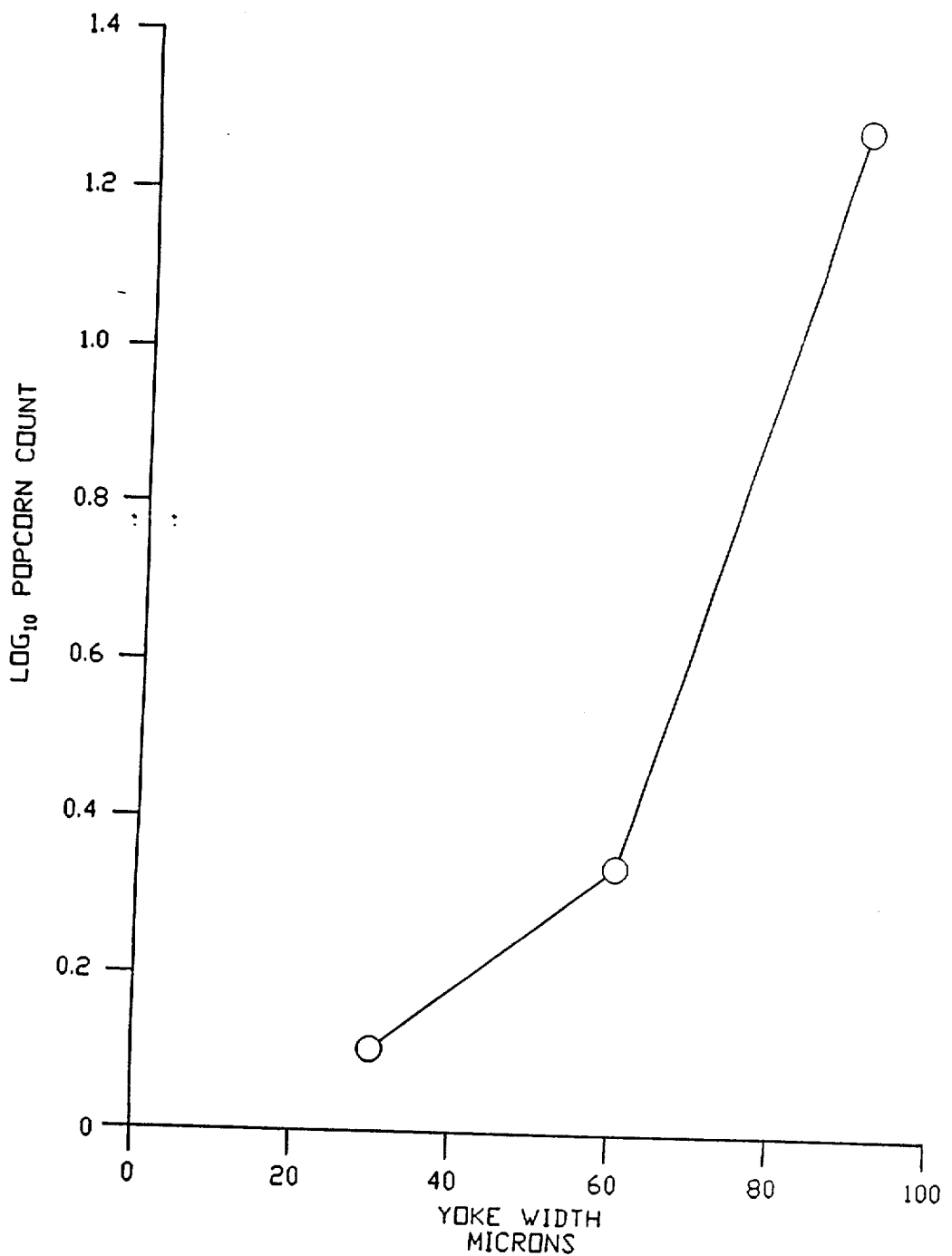

FIG. 4 illustrates the experimental logarithm of the popcorn count versus yoke width for the same sample set of heads at 90, 60 and 30 micron widths. This complementary set of experimental data involving popcorn noise clearly indicates that the popcorn noise count dramatically increases at yoke widths greater than 60 microns. Thus the two complementary experiments indicate that with respect to popcorn noise, the yoke widths greater than 60 microns result in dramatically inferior performance and, with respect to consumed window +3 sigma (FIG. 3), the yoke widths less than 60 microns provide dramatically superior performance. It is evident that the critical dimension of 60 microns is supported by the two separate experimental results. At higher frequency signal levels to which the technology is moving, the improvement in signal-to-noise ratio becomes more pronounced. In a preferred implementation of this invention as shown in FIG. 2, the yoke has parallel sides delineating a width of about 30 $\mu$m, a yoke height measured from the back closure to the transducing gap G of about 130 $\mu$m, and 42 coil turns. With this configuration, popcorn noise was effectively reduced. In tests conducted with the novel head design having these specified dimensions, only one noise spike was detected during 10,000 read and write cycles, which is considered essentially free of noise spikes. During the same series of tests, yoke designs having widths of 60 $\mu$m and 90 $\mu$m and heights of 100–120 $\mu$m experienced noise spikes as high as 22 per 10,000 read and write cycles.

As a result of the very narrow yoke width disclosed herein and the resultant reduction in volume of magnetic yoke, there is less circuit inductance. Since back voltage is proportional to inductance, a lowered inductance results in a lower back voltage and a decrease in rise time of the write current. By using the yoke design and critical width dimension disclosed herein, the write signals are virtually clear of noise spikes and require less rise time. Also a substantial improvement in circuit resonance and high frequency response and thus in circuit operating efficiency are realized.

Prior art heads typically are formed with a yoke height of about 110 $\mu$m–130 $\mu$m measured from the back closure to the pole end of the transducing gap and a yoke width of at least 60 to 70 $\mu$m, and typically 90–170 $\mu$m. Prior art thin film head yoke structures have a height to width aspect ratio of less than 2, for example 110 $\mu$m–120 $\mu$m in height to 80–170 $\mu$m in width. This type of prior art design, with an extended width such as found in conventional pancake type yoke structures, requires more magnetic material than is practically needed for efficient head circuit operation. Using the preferred implementation of this invention of yoke width of about 30 $\mu$m and height of 130 $\mu$m, the amount of material is reduced to much less than ⅓ of the material used in typical prior art heads. The dimensions for the yoke design disclosed herein allows the use of less material and affords the advantages of minimal or virtually no significant popcorn noise. In addition, the reduced inductance realizes an improved high frequency response while maintaining good signal level and writing performance. By virtue of the very narrow width yoke structure, unfavorable magnetic domain configurations which can degrade head performance re practically eliminated.

What is claimed is:

1. A thin film magnetic head comprising:
   a nonmagnetic substrate;
   a magnetic yoke structure formed with a narrow rectangular section of a predetermined width disposed over said substrate, said yoke structure including first and second magnetic layers having portions with substantially parallel sides, said layers making contact to form a closure and a continuous magnetic path, said layers defining a transducing gap therebetween;
   an electrical coil disposed between said magnetic layers and electrically insulated from said yoke structure;
   characterized in that said width of said yoke structure is no greater than 55 micrometers, and the height of said yoke structure is in the range of about 110–130 micrometers,
   whereby the excited yoke dimensions permit an optimum reduction in popcorn noise, an improved high frequency response and increased circuit efficiency.

2. A thin film magnetic head as in claim 1, wherein the width of said yoke structure is about 30 microns.

3. A thin film magnetic head as in claim 1, wherein the height of said yoke structure measured from said closure to said transducing gap is at least twice the width of said yoke.

4. A thin film magnetic head as in claim 1, wherein the aspect ratio, representing height measured against width of said yoke structure, is approximately in the range of 2.2:1 to 22:1.

5. A thin film magnetic head as in claim 4, wherein said aspect ratio is approximately 4.3:1.

6. A thin film magnetic head as in claim 1, wherein said magnetic layers are made of Permalloy material.

7. A thin film magnetic head as in claim 6, wherein said Permalloy material has a magnetostriction of less than $1 \times 10^{-6}$.

* * * * *

UNITED STATES PATENT AND TRADEMARK OFFICE
CERTIFICATE OF CORRECTION

Page 1 of 3

PATENT NO. : 5,255,142
DATED : October 19, 1993
INVENTOR(S) : E. Williams, et. al.

It is certified that error appears in the above-indentified patent and that said Letters Patent is hereby corrected as shown below:

Add the Drawing sheets, consisting of Figs. 3, and 4, as shown on attached sheets.

Column 2, line 47, insert:

Fig. 3 is a plot of the consumed window + 3 sigma measured in nanoseconds versus yoke width in microns;
Fig. 4 illustrates the experimental logarithm of popcorn noise count versus yoke width.

Signed and Sealed this

Twelfth Day of April, 1994

Attest:

BRUCE LEHMAN

Attesting Officer     Commissioner of Patents and Trademarks